United States Patent [19]
Konishi et al.

[11] Patent Number: 5,242,763
[45] Date of Patent: Sep. 7, 1993

[54] BATTERY PACK AND ITS PACKAGING METHOD

[75] Inventors: Hajime Konishi, Nara; Takashi Yokoyama, Osaka; Masato Harada, Osaka; Yoshinobu Morita, Osaka, all of Japan

[73] Assignee: Matsushita Electric Industrial Co. Ltd., Kadoma, Japan

[21] Appl. No.: 863,127

[22] Filed: Apr. 3, 1992

[30] Foreign Application Priority Data

Jun. 12, 1991 [JP] Japan .................. 3-139883

[51] Int. Cl.$^5$ ............... H01M 2/22; H01M 6/44; H01M 12/04
[52] U.S. Cl. ........................ 429/27; 429/86; 429/148; 429/157; 429/159
[58] Field of Search ............. 429/27, 48, 86, 148, 429/157, 159, 162

[56] References Cited

U.S. PATENT DOCUMENTS

| | | | |
|---|---|---|---|
| 4,209,574 | 6/1980 | Ruetschi | 429/162 X |
| 4,252,756 | 2/1981 | Riesberg | 264/126 X |
| 4,547,438 | 10/1985 | McArthur et al. | 429/159 X |
| 4,923,650 | 5/1990 | Antoon et al. | 264/290.2 X |
| 4,959,280 | 9/1990 | Amthor | 429/27 |
| 5,143,804 | 9/1992 | McArthur et al. | 429/159 X |

Primary Examiner—Stephen Kalafut

[57] ABSTRACT

This invention relates to a battery pack composed of a plurality of flat type gas depolarizable galvanic cells such as the zinc-air battery system and its packaging method for such battery pack. More specifically, projections of a certain value of height are formed on at least one of the outer surfaces of the positive and negative terminals of the flat type gas depolarizable galvanic cells and a hydrophobic membrane of a certain value of Gurley number is employed in each cell in the battery pack.

10 Claims, 6 Drawing Sheets

BATTERY PACK AND ITS PACKAGING METHOD

FIELD OF THE INVENTION

This invention relates to a battery pack and its packaging method consisting of a plurality of flat type gas depolarizable galvanic cells using oxidative gas such as oxygen in the air for a depolarizer in the cathode, in the similar manner zinc-air battery systems are used as a power source of portable electronic appliances.

BACKGROUND OF THE INVENTION

Figure 4:
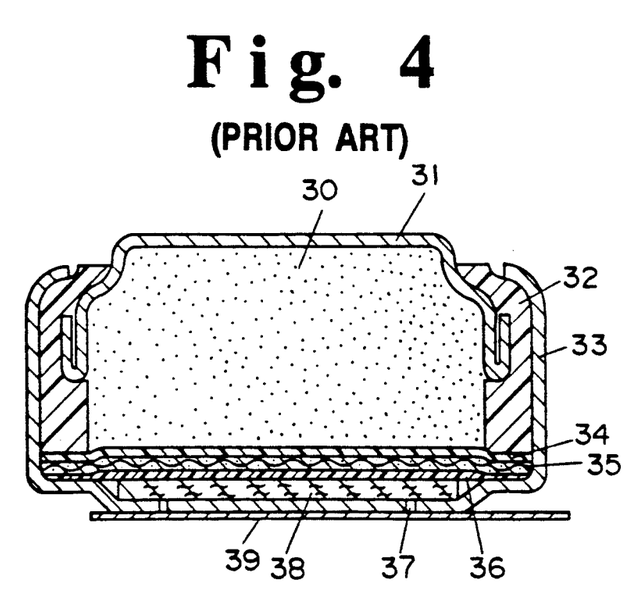
FIG. 4 shows a cross-sectional view of a typical zinc-air button cell in gas depolarizable galvanic cells.

To date, mercury batteries have been widely used as a compact, high capacity power source for various portable electronic appliances, particularly for medical ones. However, the use of mercury batteries has been regulated in many countries due to the recent environmental problems caused by heavy metal pollution. As an alternative battery system, zinc-air batteries have been developed. This battery system uses oxygen in the air as a cathode depolarizer instead of mercury oxide used in mercury batteries. The above replacement enables a reduction in the required amount of mercury while maintaining almost the same operating voltage per unit cell. Furthermore, for a cell of the same size, the zinc-air battery is approximately 40% lighter than the mercury battery while it has a two times higher discharge capacity. The button or coin type of zinc-air flat type cells are being used as a single cell in hearing aids and pagers, and recently the demand has been rapidly increasing. FIG. 4 illustrates a cross sectional view of a typical zinc-air button type cell, whereas 30 indicates a gelled anode consisting of amalgamated zinc powder of 3% or less mercury content, viscous gelling agent, and an alkaline electrolyte. The alkaline electrolyte is a potassium hydroxide aqueous solution in which zinc oxide is dissolved. 31 in FIG. 4 denotes an anode cap serving also as a negative terminal, while 32 and 33 denotes a gasket and a cell can, respectively. At the bottom of the cell can, at least one air vent, denoted 37 in FIG. 4, is provided to serve as a positive terminal. The space between the cell can 33 and the anode cap is hermetically sealed with the gasket 32 by pressing and curling the upper flange of the cell can. The hydrophobic membrane 36, the air electrode 35 of cathode, and the separator 34 are layered in order at the inner bottom of the cell can 33, the periphery of which is clamped with the gasket 32 to maintain sealing. A diffusion paper 38 is held in the gap between the hydrophobic membrane 36 and the central area of the bottom of the cell can 33. The hydrophobic membrane 36, generally made of microporous polytetrafluoroethylene (PTFE), prevents electrolyte leakage from inside of the cell. The diffusion paper 38 helps distribute air entering from the air vent 37 during discharge uniformly on the air electrode 35 through the hydrophobic membrane 36. Normally, a sealing tape 39 is attached on the external bottom of the cell can 33 and keeps closing the air vent 37 to prevent deterioration until the battery is put into use.

Figure 5A:
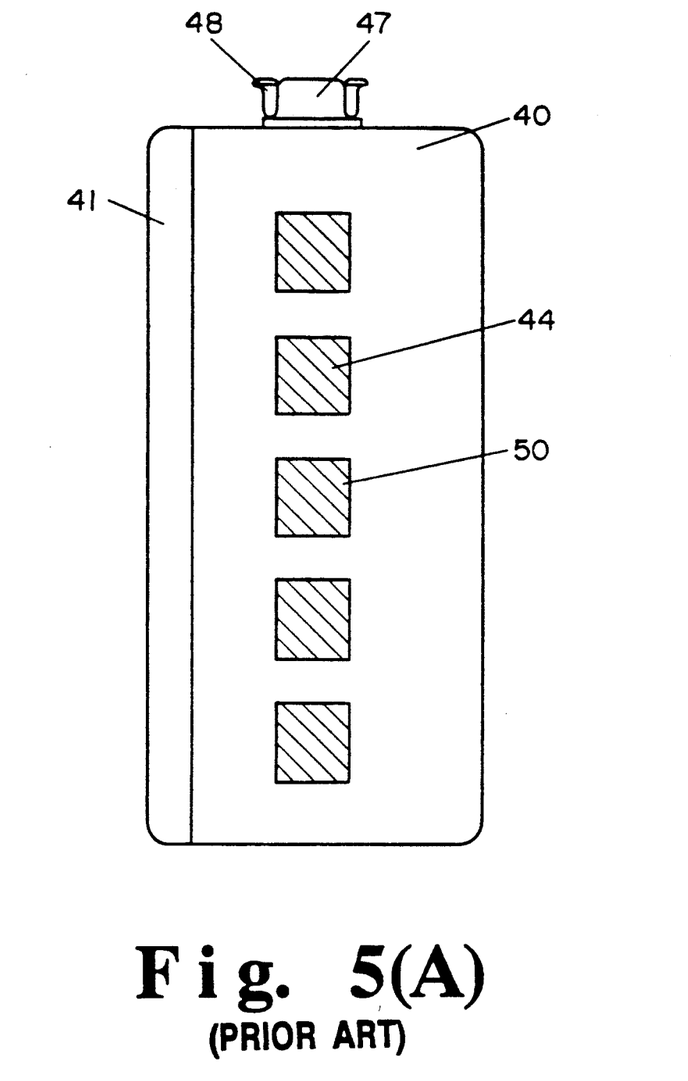
FIG. 5(A) shows an external side view of a conventional battery pack consisting of a plurality of gas depolarizable button cells.
Figure 5B:
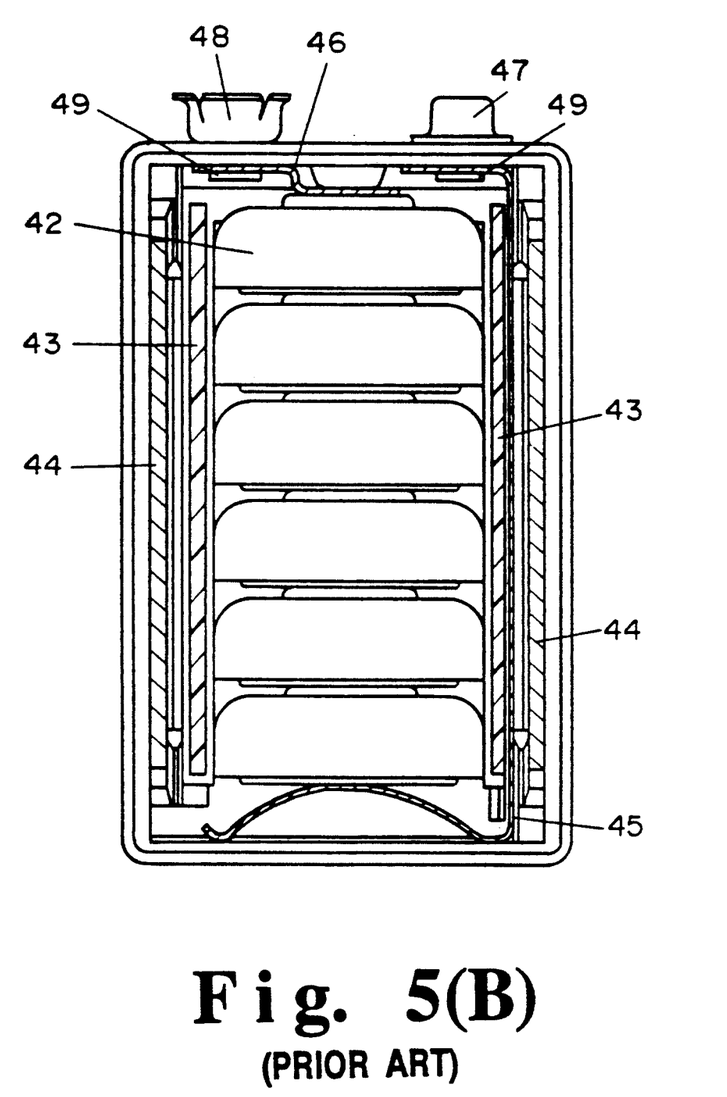
FIG. 5(B) shows a front view illustrating the internal structure of the conventional battery pack.

Besides the single cell described above, recently a battery pack consisting of a plurality of single cells connected electrically to each other has been widely used as a power source for medical portable electronic appliances instead of mercury batteries. FIG. 5(A) and (B) depict the conventional structure of a battery pack in which 6 gas depolarizable button cells are connected in a series. The above structure is typically used in the zinc-air battery system described in U.S. Pat. No. 4,547,438. FIG. 5(A) shows an external side view of the existing battery pack, where 40 denotes a plastic container equipped with several ventilators 50. 41 indicates a plastic cover that composes a battery housing with the container 40. FIG. 5 (B) is the front view of the battery pack before the cover 41 is attached on the container 40, showing the internal structure of the battery pack. 42 in the figure denote the gas depolarizable button cells. The cell stack is held along the axial line so that the 6 cells are electrically connected in a series in the battery housing. 43, 44, and 45 are an electrolyte absorbed sheet, a hydrophobic filter, and a positive internal connector, respectively. One end of the connector is made of spring material that touches the positive terminal area of the cell located at the lowest part of the cell stack and that pushes up the whole cell stack with the spring pressure to achieve electrical contact. 46 indicates a negative internal connector, one end of which is connected to the negative terminal area of the cell located at the uppermost portion of the said cell stack. The other ends of the positive and negative internal connectors, 45 and 46, are fastened to the external positive terminal 47 and the negative terminal 48, respectively, with eyelet-like rivets 49. During discharge, oxygen in the air which is a cathode depolarizer enters into the battery housing through ventilators 50 and is supplied to each cell through the filter 44 and electrolyte absorbed sheet 43.

Figures 6A, 6B:
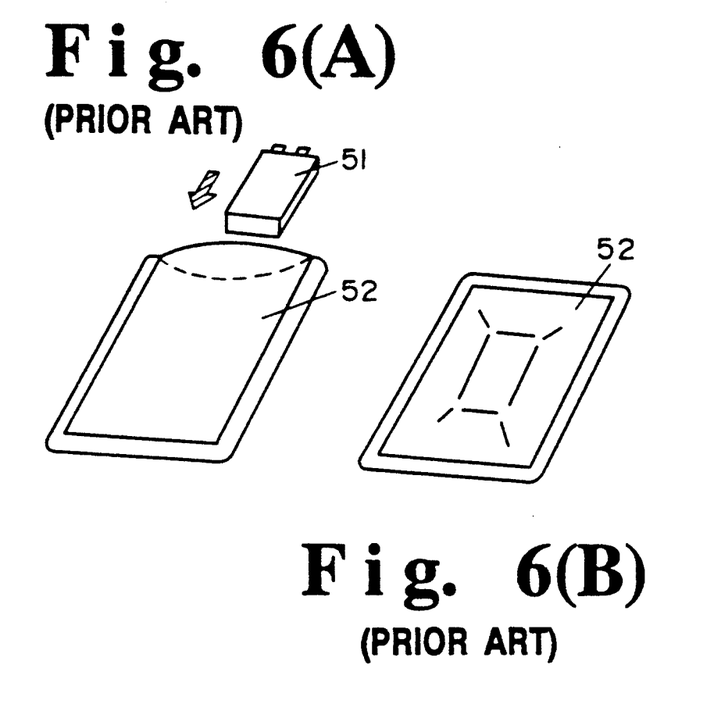
FIG. 6(A) shows a perspective view of the hermetic packaging bag on the insertion of the battery pack consisting of a plurality of gas depolarizable galvanic cells.
FIG. 6(B) shows a perspective view of the hermetic packaging bag after the said battery pack is inserted and sealed.

As shown in FIG. 6, a battery pack consisting of a plurality of gas depolarizable galvanic cells is packaged in a hermetically sealed bag and preserved until it is put into use. FIG. 6(A) depicts the way the battery pack 51 is inserted in the bag 52, while FIG. 6(B) describes the state of the bag 52 after the inlet of the bag is sealed and packaging of the battery pack 51 is completed. On the use of the battery, the battery pack is activated only when the bag is open and the battery is exposed to the air. Unlike the single cell application, the gas depolarizable galvanic cells which are composed of a cell stack are put in the battery housing without the sealing tape 39 shown in FIG. 4.

However, the conventional battery pack consisting of gas depolarizable galvanic cells have had many problems as follows.

(1) On high rate discharge, it has been observed that the diffusion rate of the air became low and the cathodic polarization occurred, leading to insufficient discharging, although notable problems have not occurred on low rate discharge.

(2) In some cases, zinc, the active material in the gelled anode in each cell, was oxidized and swelled in volume as discharge progressed. As a result, the electrolyte in the anode was squeezed and leaked through the air vent of the cell can. At the end of discharge, the cells having relatively small capacity in a battery pack consisting of more than three cells connected in a series were in an overdischarged condition accompanied by polarity reversal, followed by gas generation and severe leakage of the electrolyte in most cases. The existing battery packs have not been successful in complete stoppage of leakage, although the electrolyte absorbed sheet 43 and hydrophobic filter 44 were in use.

(3) Using the electrolyte absorbed sheet 43 and the hydrophobic filter 44 described above not only increases the number of parts, complicates the system, expands the man-hour of assembly processes, and increases the manufacturing cost, but it also causes the disadvantage of increasing the size of the battery pack.

(4) Although the battery packs are packaged in hermetic packaging bags and preserved before usage, the conventional sealing condition has not always been perfect.

DETAILED DESCRIPTION OF THE INVENTION

The main objectives of this invention are to improve the discharge characteristics under relatively high rate and storage performance of the battery pack consisting of a plurality of gas depolarizable galvanic cells and to develop a leak proof characteristics without using such additional leakage preventive components as electrolyte absorbed sheets and hydrophobic filters in the battery housing, which have been the technical problems for existing battery packs. Additionally, the reduction in the number of parts and the man-hour manufacturing processes contributes to encouraging further reduction in size and cost of the battery packs.

In this invention, a plurality of flat type galvanic cells having less noble metals such as zinc are used as an anode active material, a micro-porous hydrophobic membrane having a certain value of Gurley number is held between a gas electrode in which oxidative gas such as oxygen is used as a cathodic depolarizer and the internal wall of a cell container with vent holes, and a certain value of height of projections on at least one of the outer surfaces of the cell can serving also as a polar terminal or of the cover serving as an anti-polar terminal, are stacked along the axis and connected electrically in a series. Two groups of cell stacks are arrayed adjacent to each other in a parallel manner so that both ends of the two groups of cell stacks possess opposite polarity. The said cell two groups of stacks are held between the parallel walls of the battery housing running perpendicular to the cell stack axis. The battery housing is equipped with ventilators penetrating of oxidative gas to the inside. The positive terminal on one side of first group of cell stacks is electrically connected one end of the first conductive connector, while the other end of the first conductive connector is extended to the outside of the battery housing to form an external positive terminal. The negative terminal on one side of second group of the said cell stacks and one end of the second conductive connector are electrically connected. The other end of said second connector is also extended to the outside of the battery housing to form an external negative terminal. Then the negative terminal on the opposite side of first group of the said cell stacks is electrically connected to the positive terminal on the opposite side of second group of the said cell stacks using third conductive connector. Thus, all the cells between the external positive and negative terminals are electrically connected in a series. This invention relates to the battery pack consisting of a plurality of flat type gas depolarizable galvanic cells connected in the manner described above and to its packaging method. Detailed description of the present invention is given in the following text with reference to examples, figures, and tables.

Figure 1A:
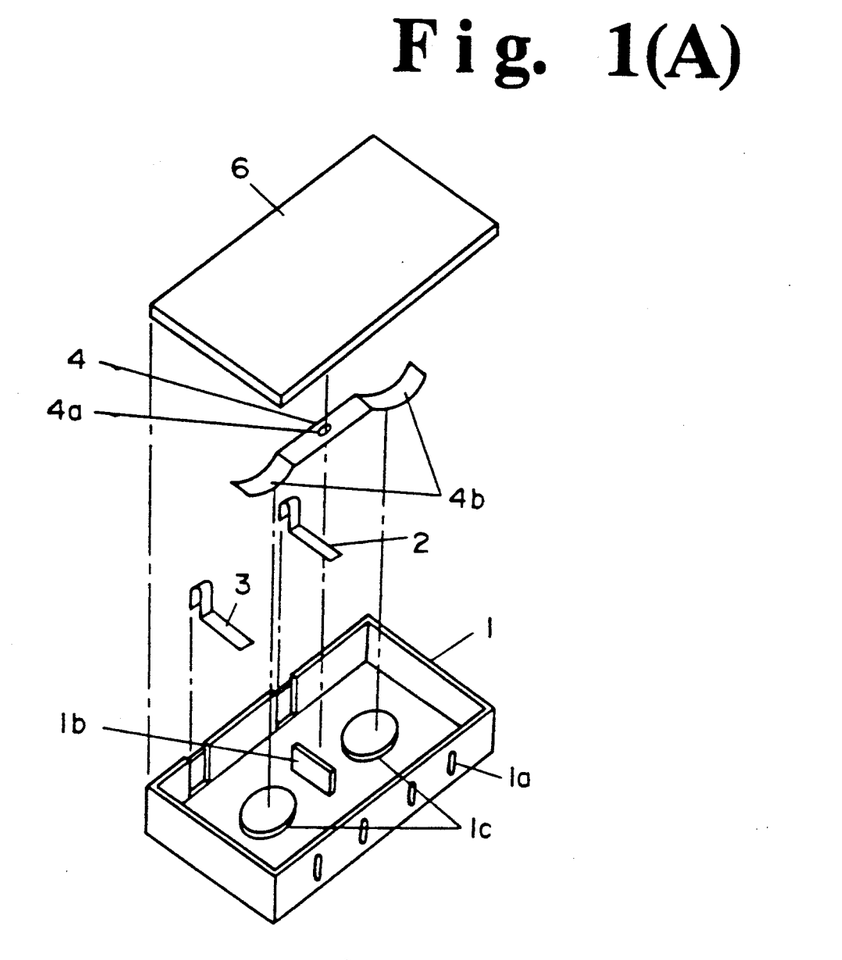
FIG. 1(A) illustrates an perspective view of the parts composed a battery housing in the battery pack consisting of a plurality of flat type gas depolarizable galvanic cells by the present invention.
Figure 1B:
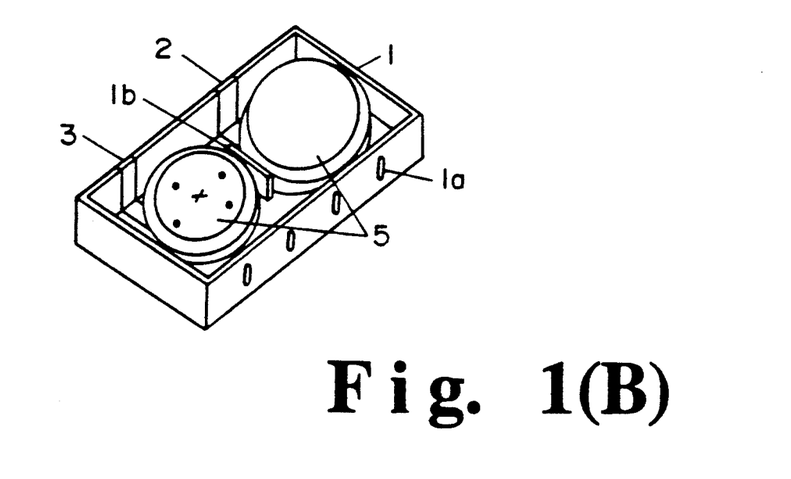
FIG. 1(B) shows the perspective view of the internal structure of battery pack consisting of a plurality of the flat type gas depolarizable galvanic cells are put in the battery housing by this invention.
Figure 2A:
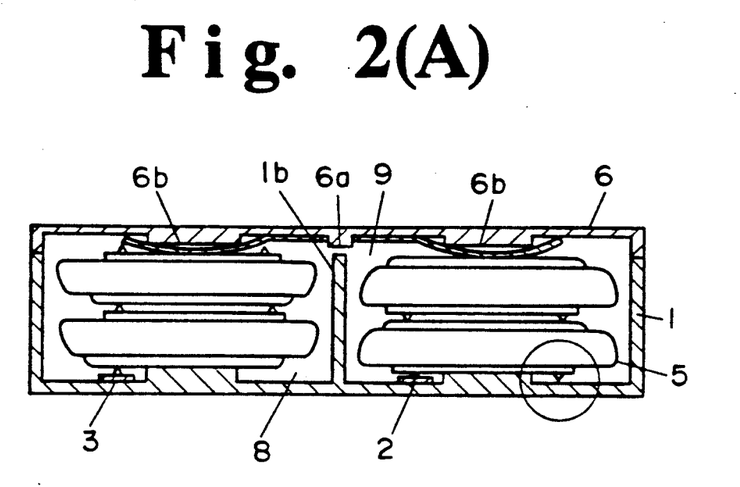
FIG. 2(A) illustrates a partial cross-sectional view of the battery pack by the present invention.

FIG. 1(A) shows an over-looked view of housing parts to compose the battery pack consisting of a plurality of flat type gas depolarizable galvanic cells by this invention, whereas FIG. 1(B) is an over-looked view of the internal structure of battery pack consisting of a plurality of the flat type gas depolarizable galvanic cells are put in the battery housing by the present invention. FIG. 2(A) and (B) illustrate the partial cross-sectional view of the battery pack and its close-up view of the important portion, respectively. In FIGS. 1 and 2, 1, 1a, 1b, and 1c denote a plastic container made of ABS, ventilators, a partition, and bases, respectively. 2 and 3 indicate the first and second conductive connectors, respectively, the tips of which are shaped like a letter U and planted at a certain location so that the tips extend over the side wall of the plastic container 1 to serve as the external positive and negative terminals of the battery pack. It is desirable to locate these terminals asymmetrically to avoid short-circuit of the battery pack. The bases 1c project from the interior bottom surface of the plastic container 1 by at least 0.1 mm, as will be mentioned later. 4 and 5 denote the third conductive connector and the flat type gas depolarizable galvanic cells, respectively, the two groups of cell stacks consisting of two cells connected in series are stacked on the bases 1c in the plastic container 1, and put in the space formed by the side wall of plastic container 1 and the partition 1b. The other end of the second conductive connector 2, the tip of which is extended to the outside of the battery housing to form an external positive terminal of the battery pack, is electrically connected to the positive terminal area of the first group of cell stack consisting of two cells connected in a series. The other end of the second conductive connector 2, the tip of which is extended to the outside of the battery housing to form an external negative terminal of battery pack, is electrically connected to the negative terminal area of the second group of cell stack consisting of two cells connected in a series. As shown in FIG. 1(B), the terminal polarities on the upper surface of the two groups of cell stacks consisting of two cells connected in a series and put adjacently in the plastic container 1 are negative and positive respectively. 6 indicates a plastic cover, inside which the third conductive connector 4 is attached, said conductive connector having curvature segments 4b extended at both ends. The third connector 4 is fixed on the plastic cover 6 either by forming a projection 6a on the interior surface of the cover to be inset in the hole 4a located at the center of the third connector, or by heating and transforming the projection after inset. Besides, the bases 6b are formed on the interior surface of the plastic cover 6 in a similar manner to the plastic container 1. Since both ends of the third connector 4 function as plate springs, two groups of cell stacks consisting of two cells connected in a series are additionally connected in a series with the aid of applied spring pressure when the plastic container 1 and the plastic cover 6 are assembled by adhesion. Consequently, four flat type gas depolarizable galvanic cells are connected in a series between the positive and negative external terminals. A secure electrical connection is assured when projections of more than one which are omitted in the figure are formed on each end of the first, second and third conductive connectors which are connected to the positive and negative terminal area of two groups of cell stacks. In this case, the pressurization strength can be greater when the projections formed on the end of connectors as stated above are to be conical in shape. And even projections formed like a cutting edge are effective when connector thickness is sufficient. However, the operating voltage of battery pack may go down because the electrical connection by spring pressure described above is not enough due to the ohmic resistance between cells and between cell stacks and connectors in the battery pack under high rate discharge. Then when the ohmic resistance can be lessened by connecting not only cells but also both positive and negative terminal areas of two groups of cell stacks and all or part of the ends of the first, second and third connectors with spot or laser welding methods, as a result the operating voltage is improved. A projection 7 formed on the cell can serve as a positive terminal, forming the gaps 8 and 9 surrounded by the bases 1c on the plastic container 1 and the bases 6b on the interior surface of the plastic cover 6 in order to facilitate the diffusion of depolarizing oxidative gas toward the cathode consisting of gas electrodes. Suitable gap length was studied under discharge tests by changing the length A shown in FIG. 2(B). The results are shown in Table 1.

Figure 2B:
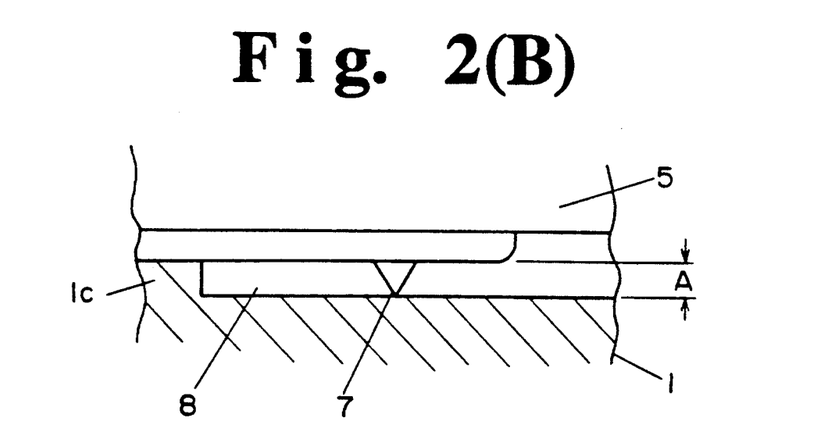
FIG. 2(B) shows the enlarged view of the important portion of the battery pack by the present invention.

The test conditions are as follows
1) Sample: battery pack (Nominal 5.6 V, 700 mAh) consisting of 4 cells of model No. PR2330 (Coin type zinc-air battery, 23.2 mm in dia., 3.0 mm in over-all height, Nominal 1.4 V, and 700 mAh) connected in a series.
2) Ambient temperature: 23° C.
3) load resistance: 400 Ω.

TABLE 1

| Length of the gap (mm) | Average discharge voltage (V) |
| --- | --- |
| 0.00 | 1.60 |
| 0.05 | 3.62 |
| 0.10 | 5.04 |
| 0.20 | 5.03 |
| 0.30 | 5.05 |

As is clearly shown in Table 1, when the battery packs are discharged at relatively high rates, the discharge voltage drops significantly for those with 0-0.05 mm gaps in length and the diffusion of the air is not sufficient. Thus, it is important to maintain larger than 0.1 mm in the height of the bases formed on the inside surface of the plastic container and plastic cover composing the battery housing, and of projections on at least one on the outer surface of the cell can serving as one polar terminal or the cover serving as the anti-polar terminal of the flat type galvanic cells. The number of the projections formed on the surface of outside of the container serving as one polar terminal for the said flat type galvanic cells varies depending on the number of vent holes through which oxidative gas enters, while the gap and vent holes needed for the diffusion of oxidative gas is secured by forming more than three vent holes. In general, as the discharge progresses in gas depolarizable galvanic cells such as zinc-air cells, less noble metals such as zinc serving as an anode active material are oxidized and result in a swelling in volume. Under severe conditions, the swelling of the cells stacking alternatively closes the vent holes and interferes with the diffusion of the oxidative gas. Therefore, the important factor of the present invention is to design a battery system maintaining the vent holes open until the end of discharging by forming more than three projections higher than 0.1 mm.

In a zinc-air button cell shown in FIG. 4, to prevent the electrolyte leakage from the cell during discharge, a micro-porous PTFE film is used for the hydrophobic membrane attached on the outside of the air electrode. If the membrane is too impermeable it will interfere with the diffusion of oxygen since the air must pass through the membrane, too. Generally, the membrane with Gurley number approximately 2,000 sec has been commonly used. However, preventing the electrolyte leakage completely during the discharge is extremely difficult for the battery pack having more than 3 cells connected in a series due to the existence of overdischarged cells involving the polarity reversal, although any significant problems do not likely occur for one cell or two cells connected in a series of zinc-air batteries. So far, some leakage preventive components such as electrolyte absorbed sheets or hydrophobic filters have been put in adjacent to the cell stack, while these components tend to make the system complicated, large size and to also increase number of parts and the manufacturing cost of the battery pack.

Therefore, we examined the leakage conditions after over-discharging by changing the Gurley number of the hydrophobic membrane in the flat type zinc-air cell composing the battery pack. In the test, 10 battery packs were used for each condition, while keeping the same ambient temperature and load resistance as the previous test. With the load resistance connected for one week after the discharge had started, we checked for leakage of the battery packs under the completely overdischarged condition. The results are shown in Table 2.

TABLE 2

| Gurley number of hydrophobic membrane (sec) | Number of leaked battery pack |
| --- | --- |
| 2,000 | 10/10 |
| 3,000 | 10/10 |
| 5,000 | 8/10 |
| 7,000 | 2/10 |
| 10,000 | 0/10 |
| 20,000 | 0/10 |
| 50,000 | 0/10 |
| 55,000 | 0/10 |

As is obviously shown in Table 2, the use of a hydrophobic membrane having a Gurley number exceeding 10,000 sec can prevent the electrolyte leakage even under the overdischarged condition involving the polarity reversal. However, when the hydrophobic membrane with a Gurley number exceeding 50,000 sec is used, the discharge characteristics deteriorate due to insufficient diffusion of oxygen that is necessary for discharging. If the hydrophobic membrane with a Gurley number of 10,000–50,000 sec is used for the battery pack consisting of zinc-air cells, there will be no need to use leakage preventive components such as electrolyte absorbed sheets or hydrophobic filters, leading to reduction in the battery pack size. In other words, the capacity can be increased while the size remains identical. The Gurley number in the above text refers to the value (time) measured by ASTM D726-58 Standard Test Methods for RESISTANCE OF PAPER TO PASSAGE OF AIR. As the Gurley number becomes larger, air permeability becomes smaller. Although the use of a micro-porous PTFE membrane is described for the hydrophobic membrane in our measurements, micro-porous polymer membranes such as the polyolefin group resins, for example polyethylene or polypropylene, etc. treated by PTFE on their surface can also be utilized as long as the membrane has a certain value of permeability for the corresponding Gurley number while retaining a reasonable hydrophobic property as well.

Figure 3:
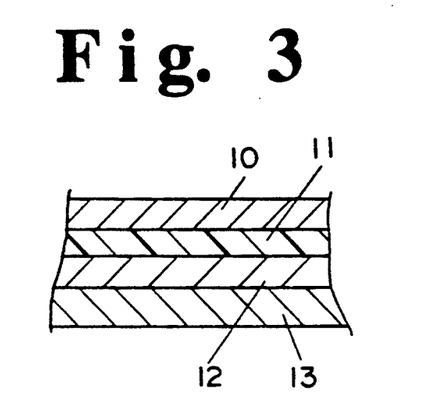
FIG. 3 shows the enlarged sectional view of the packaging laminate film for the battery pack by the present invention.

Comparison of the number of parts, man-hour rate of assembly processes, and the occurrence of the defective electrical contact was made between the existing battery packs and those consisting of a plurality of gas depolarizable galvanic cells equipped with the above hydrophobic membranes having certain value of Gurley numbers by this invention. The results are shown in FIG. 3. In the comparison of the number of parts for the battery packs, the number of cells was not counted since the number of gas depolarizable galvanic cells used in the both battery packs was different. The ratio of the man-hour of assembly processes is shown relative to that for the existing battery pack.

TABLE 3

|  | Present invention data | Prior art data |
| --- | --- | --- |
| Number of parts excepted cells | 6 | 13 |
| Man-hour ration of assembly processes | 44 | 100 |
| Number of defective electrical contact | 0/1000 | 3/1000 |

As is shown in Table 3, the battery pack by this invention reduce the number of parts, simplify the structure, and facilitate assembling, leading to a reduction in manufacturing cost and helping acquire higher reliability.

A battery pack consisting of a plurality of gas depolarizable galvanic cells such as zinc-air cells is kept in a hermetically sealed bag before usage. Our inventors studied various kinds of laminated film for their storage performance of in the above battery packs. That is, using cellophane or metal foil such as aluminum for a base film material, various combinations of thermoplastic resins such as polyvinylidene chloride (PVDC) and polyethylene (PE), polypropylene (PP), etc. were tested. The results showed that the difference between laminated thermoplastic resins was negligible if the base film material was used metal foil. FIG. 3 illustrates an enlarged sectional view of the typical laminated film, where both sides of the aluminum foil 11 for base material are laminated with a high polymerized PE layer 10 and 12 for the protection of said metal foil surface. Moreover, one side of the said laminated film is laminated with a low polymerized PE layer for heat sealing. The storage performance was evaluated with the difference of discharge characteristics by changing the thickness of the aluminum foil for base material before and after the storage test. Micro-porous PE films treated hydrophobically with PETF of Gurley number 20,000 sec were used for the hydrophobic membrane in the coin type zinc-air cell composing the battery pack prepared for the test. Five samples for of the battery packs each thickness of the aluminum foil in the laminated film for packaging bag were tested under accelerated conditions, that is, maintained at 60° C. for 20 days. Although the model of the battery pack and the discharge conditions were the same as the previous test, the discharge end voltage was until 3.6 V. The test results are shown in Table 4.

TABLE 4

| Thickness of Al foil in the laminated film ($\mu$m) | Discharging period (h) | |
| --- | --- | --- |
|  | Average | Deviation value |
| 0 | 12.1 | 5.8 |
| 3 | 40.2 | 3.6 |
| 5 | 55.5 | 1.8 |
| 7 | 56.8 | 1.2 |
| 9 | 56.3 | 1.3 |
| 12 | 56.2 | 1.1 |
| Before the storage test | 56.5 | 1.2 |

As shown in Table 4, if the thickness of the aluminum foil in the laminated film for packaging bag is more than 5 $\mu$m, the same discharge characteristics can be maintained even after the storage test, proving the storage performance with the application of suitable laminated film by the present invention.

Although a similar construction of the battery pack by this invention is shown in the U.S. Pat. No. 4,959,280, a detailed technolog as illustrated in this invention to fix the existing technical problems is not given in the above patent. Although the examples shown in this invention were described on the button and coin type gas depolarizable galvanic cells, flat types galvanic cells such as oval type or rectangular type with round corners are also available. Especially, enables the thin battery packs assembled by thin, flat type galvanic cells have enormous industrial profits as a power sources for various electronic appliances, which have been inclined to seek thinner models recently to enhance their portability.

What is claimed:

1. A battery pack composed of a cell stack comprising a plurality of flat gas depolarizable galvanic cells connected in such a manner that all of the cells between the external positive and negative terminals are electrically connected in series; a microporous hydrophobic membrane disposed between a gas electrode in each cell and an internal wall of a cell container having at least one vent opening; and wherein said micro-porous hydrophobic membrane has a Gurley number between 10,000 and 50,000 sec.

2. The battery pack of claim 1 wherein each cell has at least one projection on at least one of its surfaces that serves as one polar terminal for the cell and wherein the height of the projection is at least 0.1 mm.

3. The battery pack of claim 1 or 2 having two cell stacks within the battery pack and wherein first and second conductive connectors extend at one end to electrically connect to the positive and negative terminals of the cell stack, respectively, and said connectors are extended at the other end to form a U-shaped configuration so that the connectors climb over a wall of the battery pack to provide external terminals for the battery pack.

4. The battery pack of claim 3 wherein the external terminals are placed asymmetrically on the wall of the battery pack.

5. A battery pack of claim 3 wherein at least one projection is formed on the first and second conductive connectors to be electrically connected to the respective positive and negative terminals of the cell stack.

6. The battery pack of claim 5 wherein a third conductive connector connected electrically to the respective negative and positive terminals on the cell stacks, is made of a plate spring and is secured to an inner wall of the battery pack.

7. The battery pack of claim 5 wherein a projected section of at least 0.1 mm in height extends from a wall of the battery pack to provide a space between each cell stack and the wall for ventilation of air to the cells.

8. The battery pack of claim 2 contained in a hermetically sealed bag made of laminated metal foil wherein both sides of the metal foil are laminated with a thermoplastic polymer layer.

9. The battery pack of claim 8 wherein the metal foil is aluminum foil of at least 5 $\mu$m in thickness.

10. The battery pack of claim 9 wherein the thermoplastic polymer layer is polyethylene.

* * * * *